United States Patent [19]

Frank et al.

[11] 4,081,437

[45] Mar. 28, 1978

[54] WATER SOLUBLE POLYAZO DYESTUFFS

[75] Inventors: Pierre Frank; André Louis Sailer, both of Saint Clair du Rhone, France

[73] Assignee: Produits Chimiques Ugine Kuhlmann, Paris, France

[21] Appl. No.: 569,729

[22] Filed: Apr. 21, 1975

[30] Foreign Application Priority Data

Apr. 25, 1974 France .............................. 74 14388

[51] Int. Cl.$^2$ ..................... C09B 31/16; C09B 31/28; C09B 31/30; C09B 33/18
[52] U.S. Cl. .................................. 260/159; 260/160; 260/169; 260/166; 260/173; 260/174; 260/176; 260/178; 260/186; 260/187; 260/191
[58] Field of Search ................ 260/166, 169, 159, 173

[56] References Cited

U.S. PATENT DOCUMENTS

| | | | |
|---|---|---|---|
| 2,018,764 | 10/1935 | Paine ................. | 260/166 X |
| 2,027,206 | 1/1936 | Smith et al. ........... | 260/166 |
| 2,106,876 | 2/1938 | Schubert .............. | 260/166 X |
| 2,116,206 | 5/1938 | Krzikalla et al. ....... | 260/166 |
| 2,259,735 | 10/1941 | Crossley et al. ........ | 260/166 X |
| 3,634,390 | 1/1972 | Sommer et al. ........ | 260/159 |
| 3,917,887 | 11/1975 | Stiller ................. | 260/159 X |

FOREIGN PATENT DOCUMENTS 265,553   3/1928   United Kingdom ................ 260/159

Primary Examiner—Floyd D. Higel
Attorney, Agent, or Firm—Beveridge, DeGrandi, Kline & Lunsford

[57] ABSTRACT

Dyestuffs of the formula:

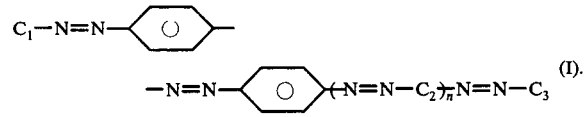

in which $C_2$ represents the radical of the formula:

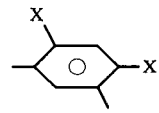

where X is $NH_2$ or OH, $C_1$ and $C_3$ are different residues of molecules $C_1H$ and $C_3H$ free from azo groups and selected from the group consisting of acetylacetic derivatives, pyrazolonic derivatives, benzenic derivatives, and naphthalenic derivatives, only one of the molecules $C_1H$ and $C_3H$ being a naphthalenic derivative, one at least of the residues $C_1$ and $C_3$ having at least one and at most two sulphonic acid groups, and $n$ having the value 0 or 1 and leather colored with such dyestuffs.

2 Claims, No Drawings

WATER SOLUBLE POLYAZO DYESTUFFS

The present invention relates to a new water-soluble tris- or tetrakis-azo dyestuffs, which are particularly suitable for dyeing leathers from different tanning processes.

According to the present invention dyestuffs are provided of the following general formula:

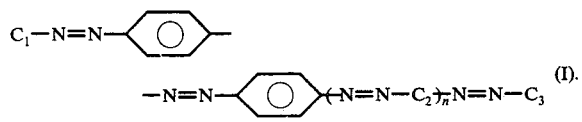  (I).

in which $C_2$ represents the radical of the formula

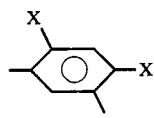

where X is $NH_2$ or OH, $C_1$ and $C_3$ are different residues of molecules $C_1H$ and $C_3H$ free from azo groups and selected from the group consisting of acetylacetic derivatives (preferably ethyl acetylacete or acetoacetanilide), pyrazolonic derivatives (preferably 1-phenyl-5-pyrazolones), benzenic derivatives (preferably mono- or diamino benzenic derivatives or mono- or dihydroxy benzenic derivatives), and naphthalenic derivatives (preferably 1-amino-naphthalene-6- (or -7-) sulphonic acids), only one of the molecules $C_1H$ and $C_3H$ being a naphthalenic derivative, one at least of the residues $C_1$ and $C_3$ having at least one and at most two sulphonic acid groups, $C_1$ and $C_3$ having 0, 1, 2 or 3 other substituents selected from methyl, ethyl, chlorine, carboxy and methoxy and $n$ having the value 0 or 1. (preferably $C_1$ is a residue derived from 1-phenyl-5-pyrazolone). The value $n = 0$ corresponds to the trisazo dyestuffs and the value $n = 1$ corresponds to the tetrakis-azo dyestuffs.

These dyestuffs are particularly suitable for dyeing leathers from different tanning processes in principally brown shades. It is surprising that a dyestuff should have such a good affinity for leathers from such different tanning processes as clear chrome leathers, semichrome leathers or vegetable tanned leathers. An excellent penetration of the dyestuff is observed which is so good that no modification in the intensity of the shade is found during the pumicing or sueding of the leather. In addition, these dyestuffs have an excellent fastness and stability to acids. They are very soluble in water and give dyeings which are very level, penetrate well and are fast to washing, dry-cleaning, dry and wet rubbing, light and sweat.

Dyestuffs of the following general formula (II):

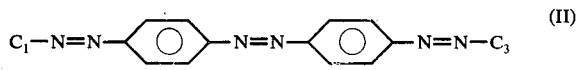 (II)

wherein $C_1$ and $C_3$ have the meanings given above, are particularly suitable for the dyeing of leathers from different tanning processes in brown shades which are very fast to the usual tests of fastness to light, washing, dry cleaning and to acids.

The trisazo dyestuffs of formula II may further form valuable intermediate products for the preparation of tetrakisazo dyestuffs, as discussed below.

The dyestuffs of formula II may be prepared for example by coupling the bis-diazo compound of a molecule of 4,4′-diaminoazobenzene first with a molecule of a coupling component of formula $C_1H$ and then with a molecule of a coupling component $C_3H$ different from the coupling component $C_1H$, one at least of the coupling components $C_1H$ and $C_3H$ containing at least one and not more than two sulphonic acid groups. Preferred coupling components $C_1H$ and $C_3H$ are for example ethyl acetylacetate, derivatives of 1-phenyl-3-methyl-5-pyrazolone in which the benzene nucleus is substituted by a sulphonic acid group in the 2′,5′-position and may carry besides one or two chlorine atoms; 1-(4′-sulphophenyl)-5-pyrazolone-3-carboxylic acid; acetoacetanilide; benzenic derivatives such as for example phenol, 1,3-dihydroxybenzene, 1,3-diaminobenzene or 2,4-diaminotoluene; or naphthalenic derivatives such as for example the 1-amino-naphthalene-6- or 7-sulphonic acids.

The dyestuffs of formula (III):

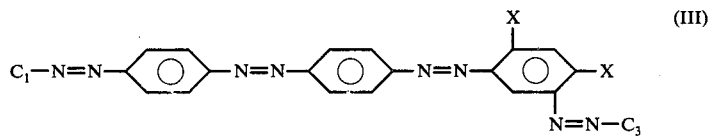 (III)

wherein $C_1$ has the meaning given above and is the residue of a coupling component $C_1H$ and carries at least 1 and not more than 2 sulphonic acid groups, $C_3$ has the meaning given above and is the residue of a diazotisable aromatic amine $C_3$—$NH_2$ carrying at least one and not more than two sulphonic acid groups, and X represents an $NH_2$ or OH grop, dyes leathers from various tanning processes in brown shades which are very fast to the usual tests.

The dyestuffs of formula (III) may be obtained for example by coupling the diazo compound of a molecule of the amine $C_3$-$NH_2$ with a molecule of a dyestuff of formula (II) in which one of the coupling components $C_1H$ preferably only has a single coupling position, and the other is 1,3-dihydroxybenzene or 1,3-diaminobenzene.

The preferred amines $C_3$—$NH_2$ are 1-aminobenzene mono- or di-sulphonic acids, the sulphonic acid group or groups occupying any one of the free positions on the benzene nucleus, and the latter may also be substituted by a methyl group or a chlorine atom.

The invention is illustrated by the following Examples in which the parts are parts by weight.

EXAMPLE 1

21.2 parts of 4,4′-diamino-azobenzene are dissolved in 300 parts of water at 50° C. and 53 parts of a 20° Be solution of hydrochloric acid. The solution is cooled to 5° C. and a solution of 14 parts of sodium nitrite in 28 parts of water is added. The mixture is bis-diazotised for an hour at 10° C. and then the slight excess of nitrous acid is destroyed by a little sulphamic acid. Then a solution of 28.4 parts of 1-(4'-sulphophenyl)-5-pyrazolone-3-carboxylic acid in 100 parts of water and 13 parts of a 36° Be solution of caustic soda is added to the bis-diazo compound in a period of an hour. The mixture is allowed to react for an hour and then a 20% solution of sodium carbonate is added in a period of an hour in order to obtain a pH of 6.5. The mixture is left to react until the mono-coupling process is ended, then a soluton of 25.4 parts of 1-(4'-sulpho-phenyl)-3-methyl-5-pyrazolone in 100 parts of water and 13 parts of a 36° Be solution of caustic soda is added. Finally 20 parts of sodium carbonate are added.

When the coupling reaction is finished, the trisazo dyestuff is isolated according to the usual processes of acidification, salting out and filtration. It dyes leathers from various tanning processes in a brown-red shade which is very fast to the usual tests.

The same dyestuffs is obtained if the bis-diazo compound of a molecule of 4,4'-diamino-azobenzene is first coupled with a molecule of 1-(4'-sulpho-phenyl)-3-methyl-5-pyrazolone and then with a molecule of 1-(4'-sulpho-phenyl)-5-pyrazolone-3-carboxylic acid.

Table 1 gives other Examples of dyestuffs prepared according to the directions of Example 1 and corresponding to formula II given above:

Table 1

| Example | $C_1H$ | $C_3H$ | Shade on leather |
|---|---|---|---|
| 2 | 1-(4'-sulpho-phenyl)-5-pyrazolone-3-carboxylic acid | 1-(3'-sulpho-phenyl)-3-methyl-5-pyrazolone | brown red |
| 3 | " | 1-(2'-chloro-5'-sulpho-phenyl)-3-methyl-5-pyrazolone | " |
| 4 | " | 1-(2',5'-dichloro-4'-sulpho-phenyl)-3-methyl-5-pyrazolone | " |
| 5 | " | 1,3-dihydroxy-benzene | red brown |
| 6 | " | 1,3-diamino-benzene | violet brown |
| 7 | 1-(4'-sulpho-phenyl)-3-methyl-5-pyrazolone | 1-amino-naphthalene-6-sulphonic acid | brown |
| 8 | " | 1-amino-naphthalone-7-sulphonic acid | " |
| 9 | " | 1,3-dihydroxy-benzene | reddish brown |
| 10 | 1-(2',5'-disulpho-phenyl)-3-methyl-5-pyrazolone | " | " |
| 11 | 1-(4'-sulpho-phenyl)-5-pyrazolone-3-carboxylic acid | N-acetylacetyl-aniline | brownish scarlet |
| 12 | " | ethyl acetyl-acetate | " |
| 13 | 1-amino-naphthalene-6-sulphonic acid | phenol | violet brown |
| 14 | 1-amino-naphthalene-7-sulphonic acid | " | " |

The dyestuff obtained by coupling the bis-diazo compound of 21.2 parts of 4,4'-diamino-azobenzene first with 25.4 parts of 1-(4'-sulpho-phenyl)-3-methyl-5-pyrazolone and then 11 parts of 1,3-dihydroxy-benzene is prepared according to the directions of Example 9. When the trisazo dyestuff is formed, the diazo compound of 25.3 parts of aniline 2,5-disulphonic acid is added. When the coupling reaction is finished, the tetrakis-azo dyestuff obtained is isolated according to the usual processes. It dyes leathers from various tanning processes in a red-brown shade which is very fast to the usual tests.

Table 2 gives other Examples of dyestuffs prepared according to the directions in Example 15 and corresponding to the formula III shown above.

Table II

| Example | X | $C_1H$ | $C_3$-$NH_2$ | Shade on Leather |
|---|---|---|---|---|
| 16 | OH | 1-(3'-sulpho-phenyl-3-methyl-5-pyrazolone | aniline-2,5'-disulphonic acid | red brown |
| 17 | " | 1-(2',5'-disulpho-phenyl)-3-methyl-5-pyrazolone | " | " |
| 18 | " | 1-(4'-sulpho-phenyl)-3-methyl-5-pyrazolone | aniline-4-sulphonic acid | " |
| 19 | " | " | aniline-3-sulphonic acid | " |
| 20 | " | " | 4-amino-toluene-3-sulphonic acid | " |
| 21 | " | " | 2-chloro-aniline-5-sulphonic acid | " |
| 22 | " | 1-(4'-sulpho-phenyl)-5-pyrazolone-3-carboxylic acid | aniline-2,5-di-sulphonic acid | " |
| 23 | $NH_2$ | 1-(4'-sulpho-phenyl)-3-methyl-5-pyrazolone | " | deep red brown |
| 24 | " | 1-(4'-sulpho-phenyl)-5-pyrazolone-3- | " | deep violet |

Table II-continued

| Example | X | $C_1H$ | $C_3$-$NH_2$ | Shade on Leather |
|---------|---|--------|--------------|------------------|
|         | carboxylic acid | | | brown |

EXAMPLE 25

100 parts of a clear chrome box-calf are rinsed, neutralised then rinsed again and then introduced into a fulling machine containing one part of the dyestuff of Example 15 in solution in 500 parts of water at 60° C. It is fulled for 45 minutes at 60° C. then a tawing paste for leather (sulphonated oil) suspended in 50 parts of water by means of a polyethoxylated dispersing agent is introduced. It is fulled for a further 30 minutes, then subjected to the usual treatments for finishing leather namely drying, rewetting and mechanical softening action. The box calf is dyed uniformly in a red-brown shade which is particularly fast to the usual tests.

EXAMPLE 26

100 parts of a clear chrome suede calf skin are rewetted in the presence of a little ammonia, then introduced into a fulling machine containing 10 parts of the dyestuff of Example 22 in solution in 2000 parts of water at 60° C. It is fulled for an hour at 60° C, then 5 parts of an 85% solution of formic acid are introduced. It is fulled for a further 30 minutes, rinsed, dried and subjected to the usual finishing treatments. A leather is obtained which is uniformly dyed over its whole thickness in a red-brown shade which is particularly fast to the usual tests.

We claim:
1. Dyestuff of the formula:

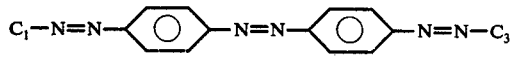

wherein $C_1$ and $C_3$ are selected from the group consisting of:
ethyl acetylacete-2-yl;
1-phenyl-3-methyl-4-yl-5-pyrazolone, in which the benzene nucleus is substituted by a sulfonic acid group in the 3' or 4' positions or by 2 sulphonic acid groups in the 2', 5' positions and by from 0 to 2 chlorine atoms;
1-(4'-sulpho-phenyl)-4-yl-3-carboxy-5-pyrazolone;
acetoacetanilide-2-yl;
phenol-yl;
1,3-dihydroxybenzene-yl; 1,3-diaminobenzene-yl;
2,4-diaminotoluene-yl; and
1-aminonaphthalene-yl-6- or 7-sulpho;
wherein $C_1H$ and $C_3H$ are coupling components and $C_1$ is different from $C_3$, and each of $C_1$ and $C_3$ is free from azo groups, and further wherein one at least of $C_1$ and $C_3$ have at least one and at most 2 sulphonic acid groups.

2. Dyestuff according to claim 1 wherein $C_1H$ is 1(4'-sulpho-phenyl)-5-pyrazolone-3-carboxylic acid; and $C_3H$ is 1-(4'-sulpho-phenyl)-3-methyl-5-pyrazolone.

* * * * *